United States Patent [19]
Linaker

[11] Patent Number: 6,086,396
[45] Date of Patent: Jul. 11, 2000

[54] HIGH CURRENT, MULTI-CONDUCTOR ELECTRICAL CONNECTOR ASSEMBLY

[76] Inventor: Derek Linaker, 23 Ashworth Park, Knutsford, Cheshire. WA16 9DE., United Kingdom

[21] Appl. No.: 08/809,509

[22] PCT Filed: Sep. 25, 1995

[86] PCT No.: PCT/GB95/02270
§ 371 Date: Mar. 24, 1997
§ 102(e) Date: Mar. 24, 1997

[87] PCT Pub. No.: WO96/09669
PCT Pub. Date: Mar. 28, 1996

[30] Foreign Application Priority Data

Sep. 24, 1994 [GB] United Kingdom ............... 9419305
Mar. 2, 1995 [GB] United Kingdom ............... 9504168
Jun. 1, 1995 [GB] United Kingdom ............... 9511104

[51] Int. Cl.$^7$ .................................................. H01R 4/60
[52] U.S. Cl. ............................................................ 439/212
[58] Field of Search ................................. 439/212, 213, 439/722; 174/72 B, 88 B, 149 B

[56] References Cited

U.S. PATENT DOCUMENTS

2,837,699  6/1958  Foré ........................................ 439/212
3,178,668  4/1965  Weimer et al. ......................... 439/212
4,008,366  2/1977  Geyer ..................................... 439/212
5,261,830  11/1993 Jego et al. ............................. 439/213

*Primary Examiner*—Paula Bradley
*Assistant Examiner*—Tho D. Ta
*Attorney, Agent, or Firm*—Pearson & Pearson

[57] ABSTRACT

An electrical connector assembly for linking electrical devices, such as switches, to three live phases and neutral of a.c. mains supply, has three main conductors and two neutral strips embedded in a solid body of polymeric material in a mold housing. The neutral strips are on opposite sides of the body and are interconnected by a spacer tube having its ends clamped against the strips by a threaded rod passed through the tube and engaging nuts. The conductors and strips are made from cut and folded conductive sheets presenting projecting terminals. At each side of the body there are groups of three live and one neutral terminal, the live terminals being individually offset and the neutral terminals being at different ends of the live terminals on opposite sides so that an arrangement results in which the groups on one side are respectively aligned with groups on the other side. The housing is trough spaced and has side slots to receive the terminals and grommets with slits fit around the terminals and close the slots. The body is fixed to a framework of mutually transverse members which provide support for the electrical devices with adjustment being provided longitudinally of the transverse members.

45 Claims, 5 Drawing Sheets

HIGH CURRENT, MULTI-CONDUCTOR ELECTRICAL CONNECTOR ASSEMBLY

TECHNICAL FIELD

This invention relates to an electrical connector assembly of the bus-bar type.

BACKGROUND ART

GB 2234922B describes an electrical connector assembly comprising a plurality of conductors disposed in spaced relationship one on top of another, each conductor being made from a strip of conductive material cut to define an elongate body with outwardly extending terminals. As described in this patent the conductive material between the terminals is bent away but retained as part of the conductor, and the respective conductors are held in spaced relationship and insulated by 'potting' in a solid body of synthetic polymeric material or resin.

With this known arrangement a high current carrying capability can be safely and reliably achieved with a relatively inexpensive structure.

In use the terminals are connected to electrical devices such as switches or isolators by direct engagement with screw connectors thereof. For a three-phase supply, there may be three live conductors providing groups of three terminals (one for each phase) spaced along each side of the assembly, the terminals of each group on one side being aligned with the terminals of one of the groups on the other side. With this arrangement, multiple electrical devices of the same kind can be conveniently arranged side by side along each side of the assembly, the devices on one side being respectively aligned with those on the other side.

In the case where it is also required to provide neutral terminals for direct connection to electrical devices (e.g. where it is desired to switch neutral as well as live phases), there is the problem of incorporating these additional terminals in the assembly in a convenient and inexpensive manner whilst maintaining the high current carrying capability.

It is possible to use conductive strip links which run beneath the assembly and provide projecting terminals on opposite sides, which links are interconnected by bolting or otherwise fastening to connecting structures. Such links can be adequately spaced from the live conductors and can provide good connection to electrical devices. However, current carrying capability can be prejudiced by the structure of the links and particularly by the nature of their interconnection. Also, if simple straight bridging links are used, the neutral terminals are aligned with each other across the assembly whereby for opposite groups of terminals the neutral terminals would be respectively on the left and on the right so that electrical devices of the same kind cannot be conveniently connected on opposite sides in alignment with each other.

DISCLOSURE OF THE INVENTION

One object of the present invention is to provide an electrical connector assembly with further terminals which are incorporated in a convenient and inexpensive manner whilst maintaining high current carrying capabilities.

According to one aspect of the present invention therefore there is provided an electrical connector assembly comprising a plurality of elongate main conductors disposed one on top of the other embedded within a solid body of polymeric material which holds the conductors spaced from and insulated relative to each other with a plurality of main terminals extending on opposite sides transversely therefrom, characterized by the provision of additional conductive strips one along each said side of the body with additional terminals extending therefrom, the additional strips being conductively linked by at least one rigid conductive element passed through the said body.

With this arrangement, the additional terminals can be easily and conveniently provided at desired positions along the body whilst the use of strips interconnected by the rigid element or elements through the body can ensure high current carrying capability.

The rigid element may comprise a tube or other elongate hollow spacer (of round or square or other cross-section), a threaded rod or bolt being passed through the spacer and through aligned holes in the additional strips for engagement with a nut or nuts. The ends of the spacer are preferably disposed so that the strips can be clamped onto the spacer ends by tightening up the nut or nuts to effect secure heavy duty electrical contact between the two strips via the rigid element. Preferably the rod or bolt is dimensioned to pass freely through the rigid element so that such rod or bolt can be easily removed and replaced without requiring disturbance of the rigid element.

The rigid element is preferably passed through and fixed within a bore in the body which may be defined by forming the body around the element.

The polymeric material may comprise any suitable extended, filled or unfilled system such as any suitable polyurethane, epoxide, polyester, methacrylic or acrylic resin which may contain any suitable inert non-conductive filler.

The main conductors may be 'potted' in the polymeric material in a mold, and the mold may be retained as an outer packaging for the assembly, as described in the aforesaid Patent GB 2234922B. Also as described in this patent, the main conductors are preferably each formed from a strip of conductive material which is cut to define an elongate body section with a plurality of the said main terminals extending transversely therefrom, and remaining material between the main terminals is retained but bent away to leave the terminals freely projecting.

Each additional strip is preferably insulated between the additional terminals, for example by powder coating, or otherwise. Alternatively and preferably each additional strip is 'potted' in the polymeric material in like manner to the main conductors.

Most preferably each additional strip is also made from a strip of conductive material which is cut and bent generally in like manner to the main conductors.

Thus, and in accordance with a second aspect of the present invention there is provided an electrical connector assembly comprising a plurality of elongate main conductors disposed one on top of the other in spaced mutually insulated relationship with main terminals projecting transversely therefrom characterized by the provision of an additional conductive strip extending longitudinally of the main conductors, said strip being cut to define an elongate body section with a plurality of additional terminals extending transversely therefrom and remaining material between the additional terminals being retained but bent away to leave the terminals freely projecting.

In this way the additional terminals can be provided in a particularly simple and convenient manner whilst ensuring high current carrying capability.

The second aspect of the invention will preferably be utilised in the context of the first aspect of the invention.

With regard to the arrangement of the various terminals, most preferably the main conductors provide groups of main terminals at spaced intervals along each side of the assembly with an additional terminal for each group. Preferably also the groups on one side are aligned relative to those on the opposite side, this being achieved by staggering the main terminals and providing the additional terminals at different ends of the groups for the opposite sides.

Thus and in accordance with a third aspect of the present invention, which is preferably combined with the first or second aspect of the invention, there is provided an electrical connector assembly comprising a plurality of elongate main conductors disposed one on top of each other in spaced mutually insulated relationship with main terminals projecting transversely therefrom in spaced groups along each of two opposite sides, characterized by the provision of interconnected additional conductive strips along said sides with additional terminals projecting therefrom, the said groups of main terminals on one side being staggered or offset relative to the said groups of main terminals on the other side, and there being a said additional terminal for each group arranged so as to effect alignment of the respective opposite groups of main and additional terminals.

With regard to the above mentioned molding or potting process it is important to provide for sealing of the mold around the projecting terminals, so that polymeric material does not escape along the surfaces of the terminals, as contamination of the terminals with such material would impair their utility as electrical connectors.

It is possible to use a two part mold of semi-rigid clear material, composed of top and bottom plastics shells, the dividing line between the shells having a line of projections which receive the terminals. This mold may be supported on a mounting plate and after setting or curing of the polymeric material, the shells may be simply left in place. With this arrangement the mold projections can limit leakage around the terminals. It has however been found to be better to use inserted closure members.

Thus, and in accordance with a further respect of the present invention there is provided a process for encapsulating an electrical connector assembly as described above, comprising the steps of providing at least one mold portion having an open face and an edge bounding said open face, a slot of a width corresponding to the width of the respective terminals being provided in said mold portion for each terminal, and extending from said edge to the location of said respective terminal, placing the assembly within the mold and locating it such that all said terminals protrude through their respective slots, closing each said slot with a respective closure member, adapted to extend from said edge to the location of said terminal and to sealingly engage said terminal and the edges of said mold part bounding said slot, and filling said mold with a settable polymeric material.

There is also provided mold apparatus for use in the above process, said apparatus comprising at least one mould portion having an open face and an edge bounding said open face, a slot of a width corresponding to the width of the respective terminal being provided in said mould portion for each terminal and extending from said edge to the location of said respective terminal, and a respective closure member for closing each said slot, each closure member being adapted to extend from said edge to the location of said terminal, and to sealingly engage said terminal and the edges of said mold part bounding said slot.

The invention further provides an encapsulated or potted assembly, having terminals extending from the encapsulating material, produced by the above process or using the above apparatus according to the invention.

If desired the mold may be closed by a cap or base which may then permanently be made part of the finished structure, and the lip of the open face of the mold part engages with this cap or base. Inlet orifices for the inflow of polymeric material are preferably provided in the cap or base. The closure means for the slots preferably comprise grommets or panel members, provided with a groove formed in each edge which abuts an edge of the slot, and may be flat along the edge which corresponds to the mold edge.

Most preferably, the closure members for the slots contain openings (e.g. in the form of slits) to allow passage therethrough of the terminals with a close fit between the terminal the edges of the openings.

Most preferably also the closure members are formed from a resilient or elastomeric material such as a natural or synthetic rubber to facilitate tight sealing fit and easy installation. The mold part may be provided as a substantially cloche or trough shaped part, closed at each end with a separate end closure. A series of slots may be provided along each side of the mold, extending up from the open face of the mold, for a corresponding number of respective projecting terminals, and each provided with a respective closure member.

It is visualised that the assembly of the invention will be used with three-phase a.c. supply whereby three main conductors are used providing live terminals of the three different phases, the additional terminals being neutral. However, the invention is not intended to be restricted to this application and other arrangements may be used as desired.

The assembly can be used with any suitable electrical devices such as circuit breakers (e.g. miniature circuit breakers and molded case circuit breakers), fused switches, isolators and the like handling voltages and currents up to say 600 volts and 800 amps or higher.

The assembly may be attached to a backing plate or tray for use in mounting the assembly on a rack or other support structure. In the case of the 'potted' assembly as described above, the plate or tray may be fixed to the assembly by incorporation of upstanding lugs of the plate or tray into the potted body. The plate or tray may have a rear reinforcing frame structure to which one or more of the lugs is attached for added strength.

In a particularly preferred alternative embodiment fixing is achieved via a backing framework comprising two sets of mutually transverse elongate members on which the electrical devices are also fixed, provision being made for positional adjustment along the length of each set. In this way different electrical devices which have different connection positions or dimensions can be accommodated by appropriate adjustment of the fixing positions in the two mutually perpendicular adjustment directions.

Preferably also, fixing of the assembly is achieved with a rigid fixing member attached to or embedded within the body of the said assembly, and a projecting fixing bolt or the like is preferably provided which is readily detachable from the rigid fixing member for replacement purposes thereby to avoid the need to disturb the body of the assembly should it be necessary to replace the fixing bolt.

BRIEF DESCRIPTION OF THE DRAWINGS

The invention will now be described further by way of example only and with reference to the accompanying drawings in which.

DESCRIPTION OF THE PREFERRED EMBODIMENT

Figure 1:
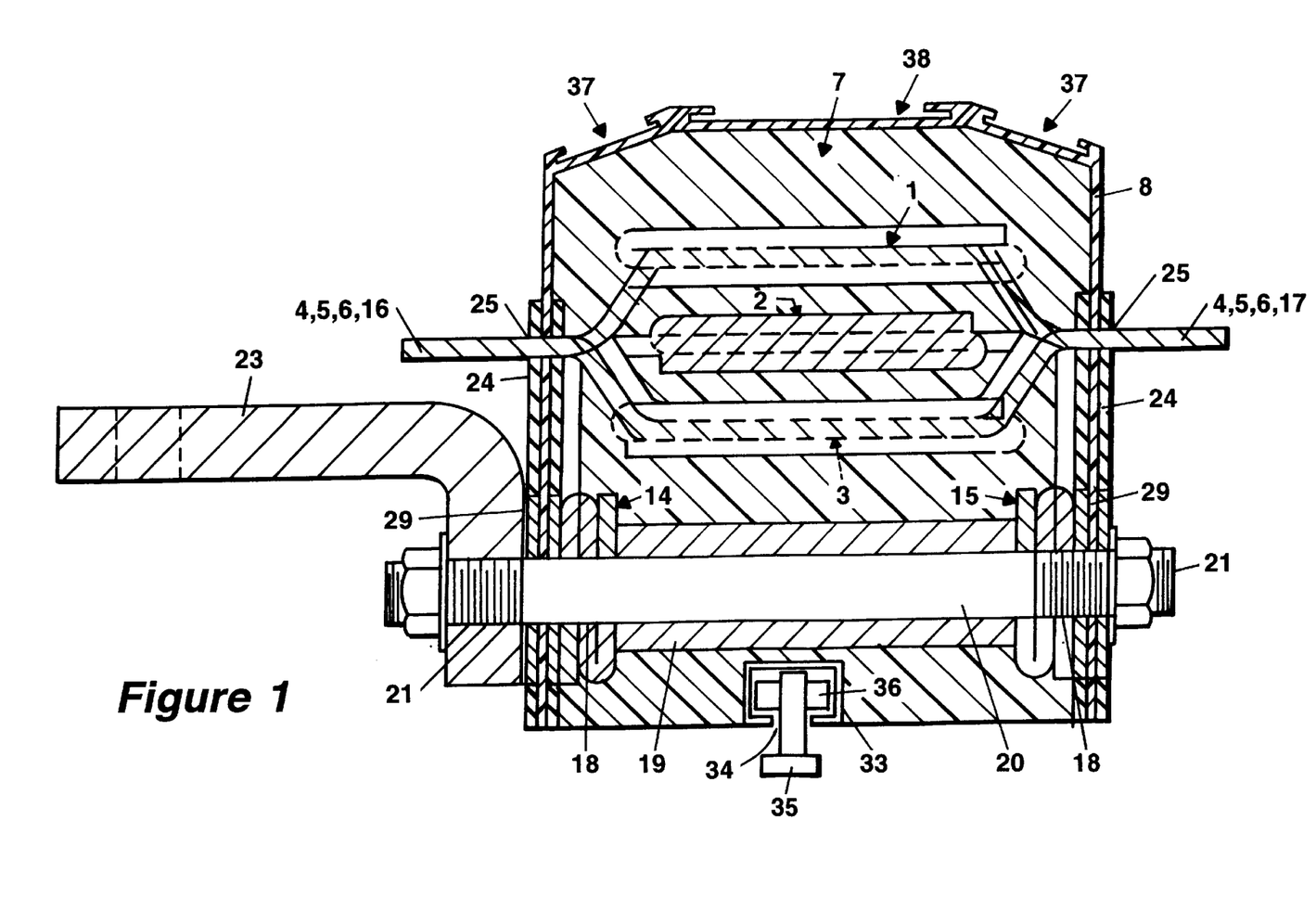
FIG. 1 is a transverse sectional view of one form of an assembly according to the invention.
Figure 2:
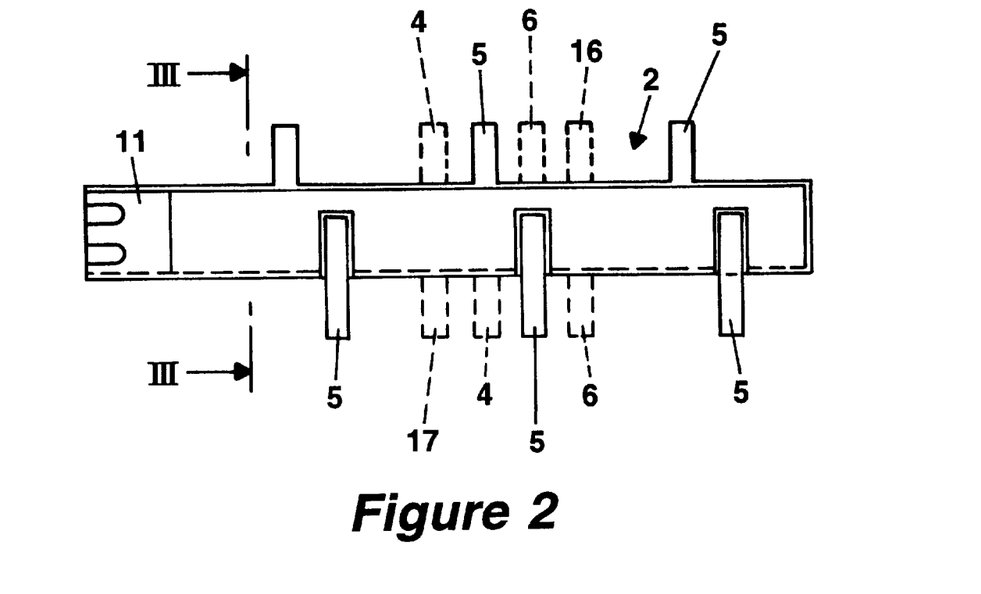
FIG. 2 is a plan view of one conductor of the assembly of FIG. 1.
Figure 3:
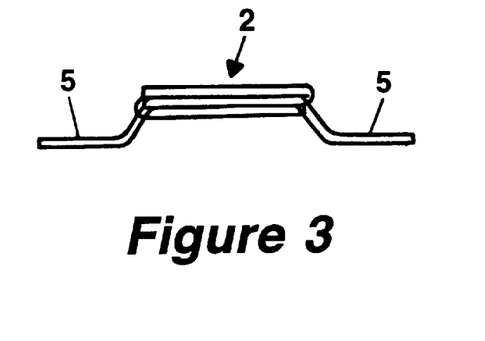
FIG. 3 is a sectional view on the line III—III of FIG. 2 but to a larger scale.

Referring now to FIG. 1, the assembly illustrated has three superimposed main conductors 1, 2, 3 each for a respective phase of an AC electrical supply and each formed from a rectangular copper strip which is cut to define spaced apart transverse terminals 4, 5, 6 projecting from each long side. The copper material between the terminals 4, 5, 6 is retained and bent back and folded to reinforce the current carrying capability of the conductor. FIGS. 2 and 3 show plan and sectional views of the conductor 2. Reference is made to GB 2234922B for further information.

FIG. 2 shows the conductor 2 which has equally spaced terminals 5 on opposite sides, each terminal 5 on one side being slightly offset from one terminal 5 on the other side. The other conductors 1, 3 have similar arrangements of terminals 4, 6.

Figure 5:
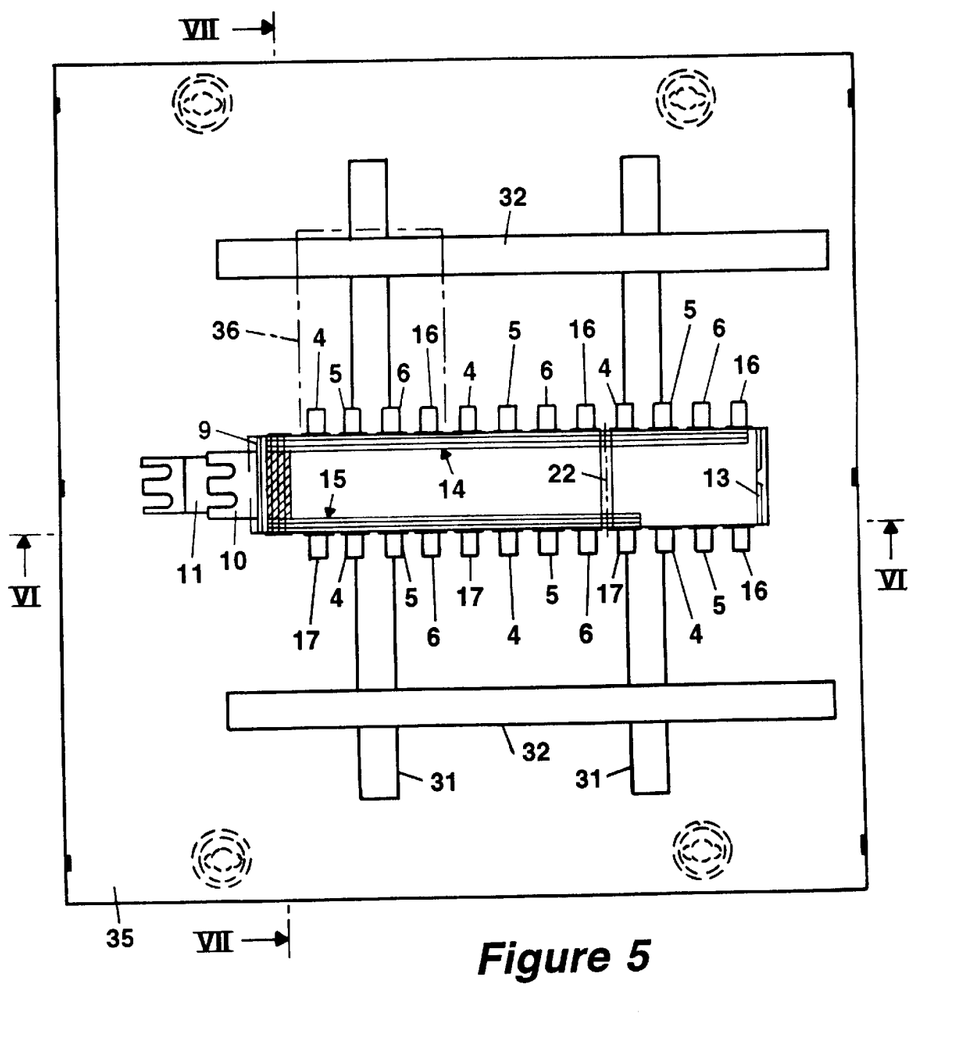
FIG. 5 is a plan view showing the mounding of the assembly on a support tray.

The different conductors 1, 2, 3 are disposed spaced one above another 'potted' within a body of electrically insulating resin 7 in a mold defined by a trough shaped plastics housing 8. The terminals 4, 5, 6 of the different conductors 1, 2, 3 are in different relative positions longitudinally of the assembly so that all terminals 4, 5, 6 are side by side. As shown in FIG. 5 the arrangement is such that along each side of the assembly of superimposed conductors there are spaced groups of three terminals 4, 5, 6 one from each conductor 1, 2, 3. The groups on one side are staggered or offset relative to the groups on the other side. This is illustrated in broken lines in FIG. 2.

Figure 6:
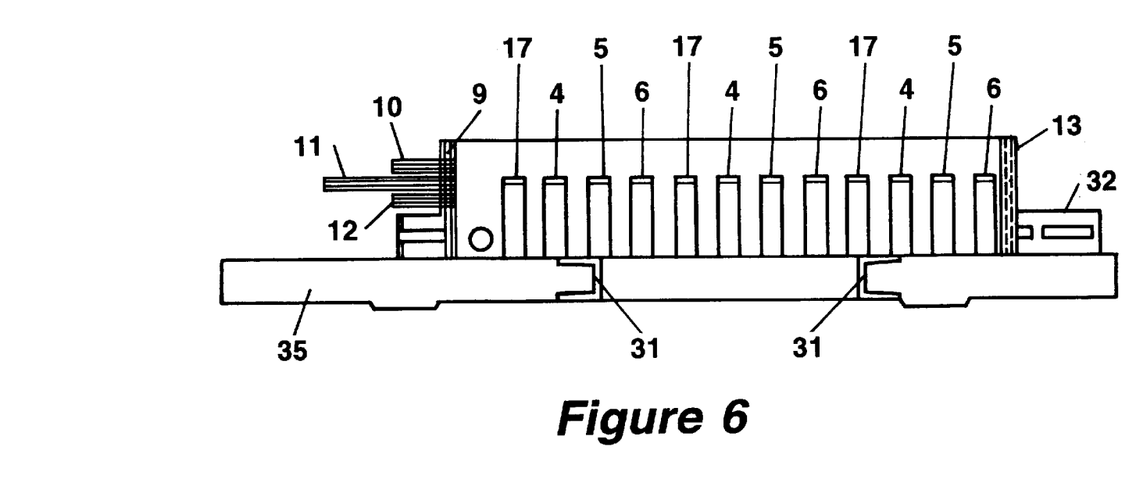
FIG. 6 is a sectional view on the line VI—VI of FIG. 5.

As can be seen in FIGS. 5 and 6 the conductors 1, 2, 3 project from one end of the housing 8 through sealed slots in an end cap 9 to provide main input connections 10, 11, 12. The other end of the housing 8 is closed with an end cap 13. It is also possible to have side projections on the conductors which exit through a side wall of the housing 8.

Figure 4:
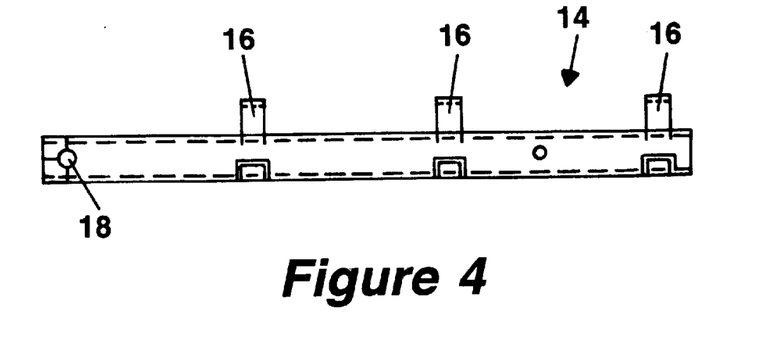
FIG. 4 is a view corresponding to FIG. 2 of an additional conductor.

As shown in FIG. 1 two additional conductors 14, 15 are provided within the housing 8, one along each side beneath the conductors 1, 2, 3. These additional conductors are formed from rectangular copper strips which are cut to define upwardly projecting spaced apart terminals 16, 17 bent outwardly at right angles. As shown in FIG. 4 the copper material between the terminals is retained and bent back and folded in like manner to the main conductors, although the terminals of the additional conductors 14, 15 project only along the top side thereof.

One conductor 14 runs along the whole length of the assembly whereas the other conductor 15 is shorter, as shown in FIG. 5. The two conductors 14, 15 terminate level with each other at one end of the assembly and, adjacent such end there are aligned bores 18 through the conductors.

The conductors 14, 15 are clamped against opposite ends of a tubular spacer member 19 by means of a rod 20 with threaded ends 21 which is passed through the spacer member 19 and the housing 8 and has nuts and washers tightly engaged therewith. The conductors 14, 15 are clamped into secure electrical contact with the member 19 and are thereby electrically interconnected. Additional electrical interconnection is established by a brass or copper tube 22 (FIG. 5), level with the member 19, which is engaged at its ends by screws passed through bores in the conductors 14, 15. At one side the rod 20 is passed through a bore in a bar 23 which is thereby clamped in electrical contact therewith on the respective outer side of the housing 8 to provide a neutral connection.

It will be seen that the additional conductors 14, 15 have additional terminals 16, 17 the number and spacing of which is such as to provide one additional terminal 16, 17 at the right hand end of each group of three main terminals 4, 5, 6. Due to the offset of the main terminals 4, 5, 6 this means that each group of three main terminals 4, 5, 6 plus one additional terminal 16, 17 on one side is precisely aligned (i.e. the terminals are aligned one to one) with a similar group on the opposite side. This is illustrated in broken lines in FIG. 2.

The connectors 1, 2, 3, 14, 15 are located within the housing 8 prior to pouring of the polymeric resin into the mold and setting of the resin, by means of cut outs in the region of each terminal 4, 5, 6, 16, 17, extending to the bottom edge of the side wall of the housing. Each such cut out is closed by a closure member or "grommet" 24.

Figure 8:
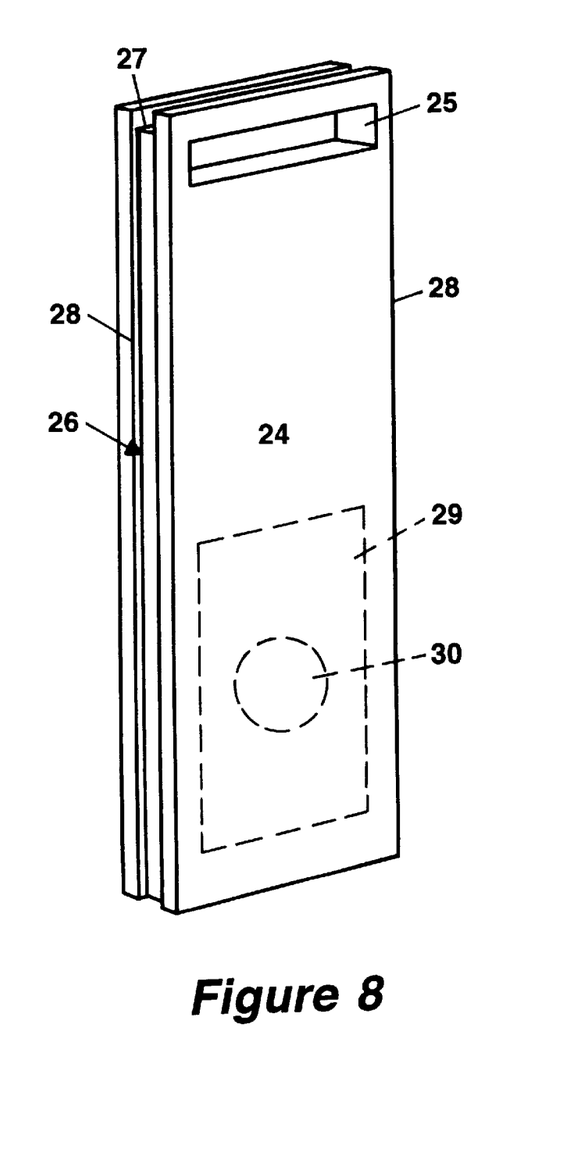
FIG. 8 is a diagrammatic perspective view of a grommet used in the assembly of FIG. 1.
Figure 9:
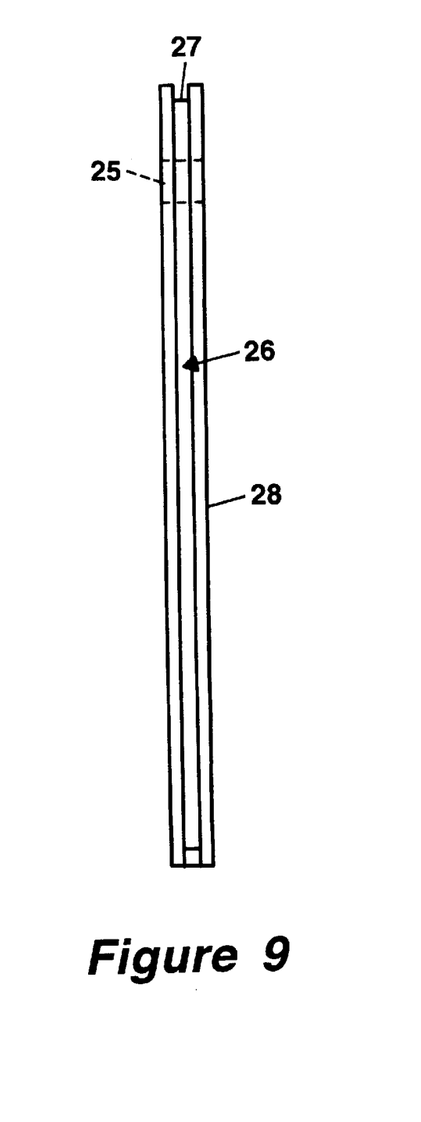
FIG. 9 is a side view of the grommet of FIG. 7.

Referring particularly to FIGS. 8 and 9 as well as FIG. 1, the cut outs in the housing 8 are rectangular and run up from the open bottom end of the housing and the housing is inverted so that the open bottom faces upwardly prior to insertion of the conductors and the potting resin. The conductors are inserted prior to injection of the polymeric material through the open top, and the gaps provided by the cut outs are each closed and sealed by the respective closure member or grommet 24, and the ends of the housing 8 are sealed by the end caps 9, 13. Each closure member 24 comprises a panel of a suitable plastics or rubber material preferably of an elastomeric nature, provided with a peripheral groove 26 on three sides— that is an end 27 which abuts the closed end of the cut out, and the two sides 28 which abut the edges of the mold housing 8 bounding the sides of the cut out. Each member 24 have an aperture or slot 25 which fits over the respective terminal 4, 5, 6, 16, 17 in a sealingly tight fit to seal the mold and to hold the conductors in position prior to setting of the polymeric material.

The bottom edge of the grommet 24 may form a continuous edge with the adjacent parts of the housing 8 which bound the open mouth of the housing.

The grommets 24 can be easily slid into place with the conductors to seal the cut outs of the housing 8. A secure seal is ensured between the grommet and the housing and between the grommet and each terminal 4, 5, 6, 16, 17 thereby to prevent any leakage of polymeric material as the mold is filled and prior to setting thereof.

The bolt 20 passes through the region of two of the grommets 24, through apertures therein constituting bores 30 formed in copper plates 29 inserted into cut outs in the grommets 24 to ensure conductive connection.

These plates 29 are indicated by the broken lines in FIG. 8, and are shown in FIG. 1. The other grommets 24 do not have these inserts or cut outs therefor.

The assembly so far described is mounted on a tray 35 via a framework of angle members. These members comprise two parallel members 31 which are securely welded or bolted to the tray at spaced apart positions, and two further members 32 which are secured to top surfaces of the members 31 and run at right angles thereto at spaced apart positions.

The members 32 are fixed to the members 31 by means of nuts and bolts engaged with elongate slots extending longitudinally in each member 31, 32, this arrangement giving the possibility of slight adjustment in two mutually perpendicular directions. Also, the members 32 can be mounted at different position along the lengths of the members 31 to give a larger positional adjustment in this direction.

The assembly has set into the bottom thereof a length of box section 33 which has an open slot 34 along its bottom wall, as shown in FIG. 1. The mold is filled with polymeric material so as to form a bottom surface level with the bottom edges of the mold housing 8, the bottom edges of the grommets 24, and the bottom wall of the box section 33 without entering the box section 33 or covering the slot 34. If desired it is possible to provide the mold with a bottom wall having holes for insertion of the polymeric material and a slot aligned with the slot 34.

The box section 33 is provided with two spaced bolts 35 with elongate retaining nuts 36, by means of which the assembly can be bolted to the members 31, the elongate slot 34 providing for positional adjustment along the length thereof in the direction of the members 32. By rotation of the nut 36 through 90° prior to tightening, the nut can be withdrawn through the slot 34 to facilitate replacement of the nut and bolt should this be required.

The box section 33 may rest on the member 19, and the tube 23, if desired via an insulating spacer, during potting. Alternatively, the box section 23 may be supported at its ends in cut outs in the end caps 9, 13 or may be supported and positioned in any other suitable manner.

In use, the tray 35 is mounted on a rack or other support, the incoming terminals 10–12 are connected to the live connections of three-phase a.c. supply, the bus bar 22 is connected to neutral of the supply, and electrical devices 36 (FIG. 7) such as isolator switches are mounted along the sides of the assembly with each group of main terminals 4, 5, 6 (with or without the associated neutral terminal 16 or 17) connected to screw connectors of a respective switch 36.

Figure 7:
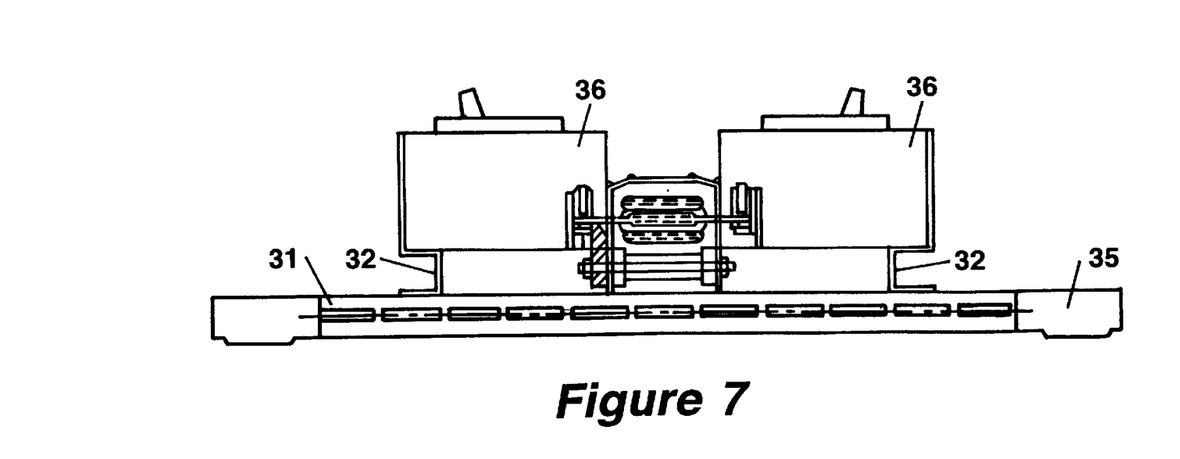
FIG. 7 is a sectional view on the line VII—VII of FIG. 5.

The electrical devices 36 are mounted on the members 32, as shown in FIG. 7, by engagement of bolts in the electrical devices with caged nuts slidable along slots in the members 32, this giving the possibility of longitudinal positional adjustment in the direction of the members 32.

The housing 8, as shown in FIG. 1, is made (e.g. by extrusion) with channels 37, 38 at its top surface. Identification strips can be slid into these channels and retained in position by projections (not shown) at each end.

The arrangement can be used with four pole isolators (which switch neutral as well as live) or with three pole isolators (which only switch live phases, the neutral being permanently connected via a separate link or lead).

It is possible for isolators 36 which are of a like four pole construction to be uniformly and symmetrically disposed on opposite sides of the assembly due to the staggered or offset distribution of the main terminals 4, 5, 6, which means that each group of live and neutral terminals 4, 5, 6, 16 on one side is aligned with a similar group of terminals 4, 5, 6, 17 at the other side.

The mode of construction of the neutral conductors 14, 15 and their secure interconnection via the rigid spacer tubes 19 ensures safe, reliable handling of high currents. In particular high power surges such as may arise in short circuit conditions can be accommodated without undue tendency for a dangerous or damaging response, such as explosion, to occur.

Incorporation of the conductors 14, 15 with the conductors 1, 2, 3, within the body of polymeric material facilitates insulation.

The positional adjustments which are possible, as described above, arising from the mode of attachment of the devices 36 to the members 32, the interconnection of the members 31, 32, and the mounting of the assembly on the members 31, ensure that a range of different types of electrical devices having different sizes can be accommodated.

The invention is not of course intended to be restricted to the details of the above embodiment which are described by way of example only.

Thus, although it is preferred to use offset groups of live terminals, the described additional conductors can be incorporated in an arrangement using aligned live terminals.

I claim:

1. An electrical connector assembly comprising a plurality of elongate main conductors, each conductor having a plurality of main terminals extending from opposite sides thereof, said main conductors disposed one on top of the other embedded within a solid body of polymeric material which holds the conductors spaced from and insulated relative to each other with said plurality of main terminals extending on opposite sides transversely therefrom, characterized by the provision of additional conductive strips having additional terminals extending from one side thereof, said additional conductive strips disposed one along each side of the body with said additional terminals extending on opposite sides transversely therefrom, the other side of the additional conductive strips being conductively linked by at least one rigid conductive elements passed through the body.

2. An assembly according to claim 1 characterized in that each additional strip is also embedded in the body.

3. An assembly according to claim 1 characterized in that the main conductors provide groups of main terminals at spaced intervals along each side of the assembly with one of said additional terminals for each group.

4. An assembly according to claim 3 characterized in that the groups on one side are aligned relative to those on the opposite side.

5. A process for encapsulating an electrical connector assembly according to claim 1 comprising the steps of providing at least one mold portion having an open face and an edge bounding said open face, a slot of a width corresponding to the width of the respective terminals being provided in said mold portion for each terminal, and extending from said edge to the location of said respective terminal, placing the assembly within the mold and locating it such that all said terminals protrude through their respective slots, closing each said slot with a respective closure member, adapted to extend from said edge to the location of said terminal and to sealingly engage said terminal and the edges of said mold part bounding said slot, and filling said mold with a settable polymeric material.

6. A process according to claim 5 wherein each closure means is formed from a resilient or elastomeric material.

7. A process according to claim 5 wherein the mold part is a trough shaped part with end closures.

8. Moulding apparatus for use in the process of claim 5 comprising at least one mold portion having an open face and an edge bounding said open face, a slot of a width corresponding to the width of the respective terminal being provided in said mold portion for each terminal and extending from said edge to the location of said respective terminal, and a respective closure member for closing each said slot, each closure member being adapted to extend from said edge to the location of said terminal, and to sealingly engage said terminal and the edges of said mold part bounding said slot.

9. An assembly according to claim 1 in combination with electrical devices connected to the terminals, characterized in that the body is fixed to a backing framework comprising two sets of mutually transverse elongate members on which the electrical devices are also fixed, provision being made for positional adjustment along the length of each set.

10. An assembly according to claim 9 characterized in that fixing of the assembly is achieved with a rigid fixing member attached to the body of the assembly, and a projecting fixing element which is detachable from the fixing member.

11. An assembly according to claim 1 characterized in that the rigid element comprises an elongate hollow spacer with a threaded rod or bolt passed therethrough and engaged with a nut or nuts to clamp ends of the spacer into electrical contact with the additional strips.

12. An assembly according to claim 11 characterized in that each said main conductor is formed from a strip of conductive material which is cut to define an elongate body section with a plurality of the said main terminals extending transversely therefrom, and remaining material between the main terminals is retained but bent away to leave the terminals freely projecting.

13. An assembly according claim 11 characterized in that each said additional strip is formed from a strip of conductive material which is cut to define an elongate body section with a plurality of the said additional terminals extending transversely therefrom, and remaining material between the additional terminals is retained but bent away to leave the additional terminals freely projecting.

14. An assembly according to claim 1 characterized in that the rigid element is fixed in the body by forming the body around the element.

15. An assembly according to claim 14 characterized in that each said main conductor is formed from a strip of conductive material which is cut to define an elongate body section with a plurality of the said main terminals extending transversely therefrom, and remaining material between the main terminals is retained but bent away to leave the terminals freely projecting.

16. An assembly according claim 14 characterized in that each said additional strip is formed from a strip of conductive material which is cut to define an elongate body section with a plurality of the said additional terminals extending transversely therefrom, and remaining material between the additional terminals is retained but bent away to leave the additional terminals freely projecting.

17. An assembly according to claim 11 characterized in that the rigid element is fixed in the body by forming the body around the element.

18. An assembly according to claim 17 characterized in that each said main conductor is formed from a strip of conductive material which is cut to define an elongate body section with a plurality of the said main terminals extending transversely therefrom, and remaining material between the main terminals is retained but bent away to leave the terminals freely projecting.

19. An assembly according to claim 1 characterized in that each said main conductor is formed from a strip of conductive material which is cut to define an elongate body section with a plurality of the said main terminals extending transversely therefrom, and remaining material between the main terminals is retained but bent away to leave the terminals freely projecting.

20. An assembly according claim 19 characterized in that each said additional strip is formed from a strip of conductive material which is cut to define an elongate body section with a plurality of the said additional terminals extending transversely therefrom, and remaining material between the additional terminals is retained but bent away to leave the additional terminals freely projecting.

21. An assembly according to claim 19 characterized in that the main conductors provide groups of said main terminals at spaced intervals along each side of the assembly with one of said additional terminals for each group.

22. An assembly according to claim 1 characterized in that each additional strip is formed from a strip of conductive material which is cut to define an elongate body section with a plurality of the said additional terminals extending transversely therefrom, and remaining material between the additional terminals is retained but bent away to leave the additional terminals freely projecting.

23. An assembly according to claim 22 characterized in that each said additional strip is also embedded in the body.

24. An assembly according to claim 22 characterized in that the main conductors provide groups of said main terminals at spaced intervals along each side of the assembly with one of said additional terminals for each group.

25. A process according to claim 5 wherein the closure means for each slot comprises a grommet with a groove in each edge which abuts an edge of the mold bounding the slot.

26. A process according to claim 25 wherein each closure means contains an opening to allow tight passage therethrough of the respective terminal.

27. A process according to claim 25 wherein the mold part is a trough shaped part with end closures.

28. Molding apparatus for use in the process of claim 25 comprising at least one mold portion having an open face and an edge bounding said open face, a slot of a width corresponding to the width of the respective terminal being provided in said mold portion for each terminal and extending from said edge to the location of said respective terminal, and a respective closure member for closing each said slot, each closure member being adapted to extend from said edge to the location of said terminal, and to sealingly engage said terminal and the edges of said mold part bounding said slot.

29. An assembly made by the process of claim 25.

30. A process according to claim 5 wherein each closure means contains an opening to allow tight passage therethrough of the respective terminal.

31. A process according to claim 30 wherein each closure means is formed from a resilient or elastomeric material.

32. An assembly made by the process of claim 5.

33. An assembly according to claim 32 in combination with electrical devices connected to the terminals, characterized in that the body is fixed to a backing framework comprising two sets of mutually transverse elongate members on which the electrical devices are also fixed, provision being made for positional adjustment along the length of each set.

34. An assembly according to claim 33 characterized in that fixing of the assembly is achieved with a rigid fixing member attached to the body of the assembly, and a projecting fixing element which is detachable from the fixing member.

35. An electrical connector assembly comprising a plurality of elongate main conductors, each conductor having a plurality of main terminals extending from opposite sides thereof, said main conductors disposed one on top of the other embedded within a solid body of polymeric material which holds the conductors spaced from and insulated relative to each other with said plurality of main terminals extending on opposite sides transversely therefrom, characterized by the provision of an additional conductive strip having additional terminals extending from one side thereof said additional conductive strip disposed along one said side of the body with said additional terminals extending therefrom at said side only, said strip being cut to define an elongate body section with a plurality of terminals extending transversely therefrom and remaining material between the additional terminals being retained but bent away to leave said additional terminals freely projecting.

36. An assembly according to claim 35 characterized in that each said additional strip is also embedded in the body.

37. An assembly according to claim 35 characterized in that the main conductors provide groups of said main terminals at spaced intervals along each side of the assembly with one of said additional terminals for each group.

38. An assembly according to claim 37 characterized in that the groups on one side are aligned relative to those on the opposite side.

39. A process for encapsulating an electrical connector assembly according to claim 35 comprising the steps of providing at least one mold portion having an open face and an edge bounding said open face, a slot of a width corresponding to the width of the respective terminals being provided in said mold portion for each terminal, and extending from said edge to the location of said respective terminal, placing the assembly within the mold and locating it such that all said terminals protrude through their respective slots, closing each said slot with a respective closure member, adapted to extend from said edge to the location of said terminal and to sealingly engage said terminal and the edges of said mold part bounding said slot, and filling said mold with a settable polymeric material.

40. A process according to claim 39 wherein the closure means for each slot comprises a grommet with a grove in each edge which abuts an edge of the mold bounding the slot.

41. An assembly according to claim 35 in combination with electrical devices connected to the terminals, characterized in that the body is fixed to a backing framework comprising two sets of mutually transverse elongate members on which the electrical devices are also fixed, provision being made for positional adjustment along the length of each set.

42. An assembly according to claim 41 characterized in that fixing of the assembly is achieved with a rigid fixing member attached to the body of the assembly, and a projecting fixing element which is detachable from the fixing member.

43. An electrical connector assembly comprising a plurality of elongate main conductors, each conductor having a plurality of main terminals extending from opposite sides thereof, said main conductors disposed one on top of the other within an insulated body which holds the conductors spaced from and insulated relative to each other with said main terminals projecting transversely therefrom in spaced groups along each of two opposite sides of said body, characterized by the provision of interconnected additional conductive strips having additional terminals extending from one side thereof said additional conductive strips disposed along said opposite sides of said body with said additional terminals projecting therefrom, the said groups of main terminals on one side being staggered or offset relative to the said group of main terminals on the other side and there being one of said additional terminals for each group arranged so as to effect alignment of the respective opposite groups of main and additional terminals.

44. An assembly according to claim 43 in combination with electrical devices connected to the terminals, characterized in that the body is fixed to a backing framework comprising two sets of mutually transverse elongate members on which the electrical devices are also fixed, provision being made for positional adjustment along the length of each set.

45. An assembly according to claim 44 characterized in that fixing of the assembly is achieved with a rigid fixing member attached to the body of the assembly, and a projecting fixing element which is detachable from the fixing member.

* * * * *